(12) United States Patent
Chen et al.

(10) Patent No.: US 11,778,576 B2
(45) Date of Patent: Oct. 3, 2023

(54) METHOD FOR PROCESSING ROUND TRIP DELAY, RELATED APPARATUS, AND READABLE STORAGE MEDIUM

(71) Applicant: Huawei Technologies Co., Ltd., Shenzhen (CN)

(72) Inventors: Ying Chen, Hangzhou (CN); Hejia Luo, Hangzhou (CN); Chuili Kong, Hangzhou (CN); Rong Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 17/334,230

(22) Filed: May 28, 2021

(65) Prior Publication Data

US 2021/0288896 A1 Sep. 16, 2021

Related U.S. Application Data

(63) Continuation of application No. PCT/CN2019/097746, filed on Jul. 25, 2019.

(30) Foreign Application Priority Data

Nov. 30, 2018 (CN) .......................... 201811458278.8

(51) Int. Cl.
*H04B 7/185* (2006.01)
*H04B 17/10* (2015.01)
(Continued)

(52) U.S. Cl.
CPC .... *H04W 56/0015* (2013.01); *H04B 7/18519* (2013.01); *H04B 7/18547* (2013.01);
(Continued)

(58) Field of Classification Search
CPC .......... H04B 7/14–2696; H04B 17/0082–409; H04L 7/0004–10; H04L 43/02–55;
(Continued)

(56) References Cited

U.S. PATENT DOCUMENTS

| 2010/0093377 A1 | 4/2010 | Riley et al. |
| 2014/0040694 A1 | 2/2014 | Verma et al. |

(Continued)

FOREIGN PATENT DOCUMENTS

| CN | 102843777 A | 12/2012 |
| CN | 103391130 A | 11/2013 |

(Continued)

OTHER PUBLICATIONS

Nomor Research GmbH, Thales,"Considerations on MAC Timers and on RTD Compensation Offset in Non-Terrestrial Networks (NTN)," 3GPP TSG-RAN WG2 Meeting # 104, Spokane, USA, R2-1818511, total 5 pages, 3rd Generation Partnership Project, Valbonne, France (Nov. 12-16, 2018).

(Continued)

*Primary Examiner* — Timothy J Weidner
(74) *Attorney, Agent, or Firm* — Leydig, Voit & Mayer, Ltd.

(57) ABSTRACT

This application provides a method for processing a round trip delay, a related apparatus, and a readable storage medium, and pertains to the field of communications technologies. The method includes: receiving a delay quantization parameter of a common round trip delay (RTD), where the delay quantization parameter includes a first quantization parameter, and the first quantization parameter is used to indicate a height-related delay; and obtaining the common RTD based on the delay quantization parameter. The height- (Continued)

related delay is indicated by using the first quantization parameter, so that the common RTD is obtained based on the first quantization parameter.

20 Claims, 7 Drawing Sheets

(51) Int. Cl.

| | |
|---|---|
| *H04B 17/364* | (2015.01) |
| *H04B 17/382* | (2015.01) |
| *H04L 43/0864* | (2022.01) |
| *H04W 24/08* | (2009.01) |
| *H04W 56/00* | (2009.01) |
| *H04W 74/00* | (2009.01) |
| *H04W 74/08* | (2009.01) |
| *H04W 84/06* | (2009.01) |
| *H04W 88/02* | (2009.01) |
| *H04W 88/08* | (2009.01) |
| *H04W 88/16* | (2009.01) |
| *H04W 92/02* | (2009.01) |
| *H04W 92/10* | (2009.01) |
| *H04W 92/20* | (2009.01) |

(52) U.S. Cl.
CPC ....... *H04B 7/18589* (2013.01); *H04B 17/104* (2015.01); *H04B 17/364* (2015.01); *H04B 17/382* (2015.01); *H04L 43/0864* (2013.01); *H04W 24/08* (2013.01); *H04W 56/004* (2013.01); *H04W 56/0055* (2013.01); *H04W 74/008* (2013.01); *H04W 74/0833* (2013.01); *H04W 74/0891* (2013.01); *H04W 84/06* (2013.01); *H04W 88/02* (2013.01); *H04W 88/08* (2013.01); *H04W 88/16* (2013.01); *H04W 92/02* (2013.01); *H04W 92/10* (2013.01); *H04W 92/20* (2013.01)

(58) Field of Classification Search
CPC ........... H04L 4/30–48; H04L 8/22–245; H04L 24/02–10; H04L 48/02–20; H04L 56/005–0095; H04L 74/002–0891; H04L 84/005–22; H04L 88/005–188; H04L 92/02–24
See application file for complete search history.

(56) References Cited

U.S. PATENT DOCUMENTS

| | | | |
|---|---|---|---|
| 2015/0304885 A1 | 10/2015 | Jalali | |
| 2017/0163336 A1 | 6/2017 | Jalali et al. | |
| 2019/0342845 A1* | 11/2019 | Laselva | H04W 56/0045 |
| 2020/0413451 A1* | 12/2020 | Taherzadeh Boroujeni | H04W 56/005 |
| 2021/0029658 A1* | 1/2021 | Mahalingam | H04W 56/0045 |
| 2022/0007455 A1* | 1/2022 | Hong | H04W 56/005 |

FOREIGN PATENT DOCUMENTS

| | | |
|---|---|---|
| CN | 104796979 A | 7/2015 |
| CN | 106371110 A | 2/2017 |

OTHER PUBLICATIONS

Thales, HNS, Inter Digital, Nokia and Nokia Shanghai Bell, ESA, Heron, IAESI, "NR-NTN: TP for Chap 7.3 NR modifications to support NTN," 3GPP RAN Meeting #80, La Jolla, USA, RP-181380 rev from RP-180658, total 37 pages, 3rd Generation Partnership Project, Valbonne, France (Jun. 11-14, 2018).

Chunting et al., "A Preliminary Study on the Integration of Satellite Communication and Ground 5G (II)," total 22 pages (Nov. 9, 2018). With English translation.

\* cited by examiner

METHOD FOR PROCESSING ROUND TRIP DELAY, RELATED APPARATUS, AND READABLE STORAGE MEDIUM

CROSS-REFERENCE TO RELATED APPLICATIONS

This application is a continuation of International Application No. PCT/CN2019/097746, filed on Jul. 25, 2019, which claims priority to Chinese Patent Application No. 201811458278.8, filed on Nov. 30, 2018. The disclosures of the aforementioned applications are hereby incorporated by reference in their entireties.

TECHNICAL FIELD

Embodiments of this application relate to the field of communications technologies, and in particular, to a method for processing a round trip delay, a related apparatus, and a readable storage medium.

BACKGROUND

Non-terrestrial base stations such as satellites and unmanned aerial vehicles attract more attention because they can provide wider coverage. A satellite is used as an example. In a satellite communications system, a distance between a satellite base station and a user mobile terminal is relatively long, and consequently, a round trip delay (RTD) of communication between the satellite base station and the user mobile terminal is excessively long. Therefore, how to deal with a problem of an excessively long round trip delay in the satellite communications system is α challenge of a satellite communication technology.

In a related technology, when an RTD in a satellite communication process is processed, a common RTD is broadcast, so that the user mobile terminal compensates for the common RTD in advance during access. The common RTD refers to minimum delay duration between the user mobile terminal in a cell and the satellite base station, and the minimum delay duration is determined based on delay duration between the mobile terminal and the satellite base station when the satellite passes the top of the mobile terminal.

However, because a maximum value of the common RTD may reach hundreds of milliseconds, broadcasting the common RTD causes a large quantity of resource overheads.

SUMMARY

This application provides a method for processing a round trip delay, a related apparatus, a chip, a program, and a readable storage medium, to resolve a problem in a related technology. The technical solutions are as follows.

According to a first aspect, a method for processing a round trip delay is provided, including: receiving a delay quantization parameter of a common RTD, where the delay quantization parameter includes a first quantization parameter, and the first quantization parameter is used to indicate a height-related delay; and obtaining the common RTD based on the delay quantization parameter.

The height-related delay is indicated by using the first quantization parameter, so that the common RTD is obtained based on the first quantization parameter. Compared with directly broadcasting a common RTD, the method can reduce resource overheads. In addition, because resource overheads can be reduced, a feasible condition is provided for convergence between ground communication and a non-terrestrial base station such as a satellite or an unmanned aerial vehicle.

In a possible implementation, the receiving a delay quantization parameter of a common RTD includes: receiving a broadcast signal, where the broadcast signal carries the delay quantization parameter of the common RTD.

In a possible implementation, the receiving a broadcast signal includes: receiving the broadcast signal through a broadcast channel or a data channel.

In a possible implementation, the receiving a delay quantization parameter of a common RTD includes: receiving a control signal, where the control signal carries the delay quantization parameter of the common RTD.

In a possible implementation, the receiving a delay quantization parameter of a common RTD includes: receiving a system information block (SIB) transmitted through a downlink shared channel (DL-SCH), where the SIB carries the delay quantization parameter of the common RTD.

In a possible implementation, the SIB includes a common RTD field, and a value of the common RTD field is used to indicate the delay quantization parameter of the common RTD.

In a possible implementation, the delay quantization parameter further includes a second quantization parameter, and the second quantization parameter is used to indicate an angle-related delay.

By decomposing the common RTD into the height-related delay and the angle-related delay, and separately using quantization parameters to indicate the height-related delay and the angle-related delay, resource overheads can be further reduced.

In a possible implementation, the first quantization parameter and the second quantization parameter use different time quantization units.

Because the first quantization parameter and the second quantization parameter separately use different time quantization units, precision of a time compensation amount can be improved.

In a possible implementation, the first quantization parameter is a delay parameter, different heights correspond to different delay parameters, and the different delay parameters correspond to a same time quantization unit; and the delay parameter is used to determine, based on the time quantization unit, a height-related delay at a height corresponding to the delay parameter.

In a possible implementation, the first quantization parameter is a delay index, and the delay index is used to indicate a height-related delay at a height corresponding to the delay index.

In a possible implementation, the first quantization parameter includes a level-1 parameter and a level-2 parameter, the level-1 parameter is used to indicate a communications device type, the level-2 parameter is used to indicate a height, and a combination of the level-1 parameter and the level-2 parameter is used to indicate the height-related delay.

In a possible implementation, angle division manners at different heights are the same or different.

In a possible implementation, the method further includes: receiving a second quantization parameter updated based on an angle or a time period; and updating the angle-related delay based on the updated second quantization parameter.

In a possible implementation, the receiving a second quantization parameter updated based on an angle or a time period includes: receiving an updated broadcast signal, where the updated broadcast signal carries the second quantization parameter updated based on the angle or the time period.

In a possible implementation, the receiving a second quantization parameter updated based on an angle or a time period includes: receiving an updated control signal, where the updated control signal carries the second quantization parameter updated based on the angle or the time period.

The angle-related delay is updated by using the updated second quantization parameter, so that the obtained common RTD is more accurate, and precision of the time compensation amount can be further improved.

In a possible implementation, communication devices at different heights correspond to different time periods.

According to a second aspect, a method for processing a round trip delay is provided, including: obtaining a delay quantization parameter of a common RTD, where the delay quantization parameter includes a first quantization parameter, and the first quantization parameter is used to indicate a height-related delay; and sending the delay quantization parameter.

The height-related delay is indicated by using the first quantization parameter, so that a communications device that receives the delay quantization parameter can obtain the common RTD based on the delay quantization parameter. Compared with directly broadcasting a common RTD, the method can reduce resource overheads. In addition, because resource overheads can be reduced, a feasible condition is provided for convergence between satellite communication and ground communication.

In a possible implementation, the sending the delay quantization parameter includes: sending a broadcast signal, where the broadcast signal carries the delay quantization parameter.

In a possible implementation, the sending a broadcast signal includes: sending the broadcast signal through a broadcast channel or a data channel.

In a possible implementation, the sending the delay quantization parameter includes: transmitting a SIB through a DL-SCH, where the SIB carries the delay quantization parameter of the common RTD.

In a possible implementation, the sending the delay quantization parameter includes: sending a control signal, where the control signal carries the delay quantization parameter.

In a possible implementation, the SIB includes a common RTD field, and a value of the common RTD field is used to indicate the delay quantization parameter of the common RTD.

In a possible implementation, the delay quantization parameter further includes a second quantization parameter, and the second quantization parameter is used to indicate an angle-related delay quantized value.

By decomposing the common RTD into the height-related delay and the angle-related delay, and separately using quantization parameters to indicate the height-related delay and the angle-related delay, resource overheads can be further reduced.

In a possible implementation, the first quantization parameter and the second quantization parameter use different time quantization units.

Because the first quantization parameter and the second quantization parameter separately use different time quantization units, precision of a time compensation amount can be improved.

In a possible implementation, the first quantization parameter is a delay parameter, different heights correspond to different delay parameters, the different delay parameters correspond to a same time quantization unit, and the delay parameter is obtained based on the height-related delay and the time quantization unit.

In a possible implementation, the first quantization parameter is a delay index, and the delay index is obtained based on the height-related delay.

In a possible implementation, the first quantization parameter includes a level-1 parameter and a level-2 parameter, the level-1 parameter is used to indicate a communications device type, the level-2 parameter is used to indicate a height, and a combination of the level-1 parameter and the level-2 parameter is used to indicate the height-related delay.

In a possible implementation, angle division manners at different heights are the same or different.

In a possible implementation, the method further includes: updating the second quantization parameter based on an angle or a time period; and sending the second quantization parameter updated based on the angle or the time period.

The angle-related delay is updated by using the updated second quantization parameter, so that the obtained common RTD is more accurate, and precision of the time compensation amount can be further improved.

In a possible implementation, the sending the second quantization parameter updated based on the angle or the time period includes:

sending an updated broadcast signal, where the updated broadcast signal carries the second quantization parameter updated based on the angle or the time period.

In a possible implementation, the sending the second quantization parameter updated based on the angle or the time period includes:

sending an updated control signal, where the updated control signal carries the second quantization parameter updated based on the angle or the time period.

In a possible implementation, communication devices at different heights correspond to different time periods.

According to a third aspect, a method for processing a round trip delay is provided, including: receiving a delay quantization parameter of a common RTD, where the delay quantization parameter includes a first quantization parameter, the first quantization parameter is used to indicate a height-related delay, and the delay quantization parameter is used to obtain the common RTD.

In a possible implementation, the receiving a delay quantization parameter of a common RTD includes: receiving a broadcast signal, where the broadcast signal carries the delay quantization parameter of the common RTD.

Optionally, the receiving a broadcast signal includes: receiving the broadcast signal through a broadcast channel or a data channel.

In a possible implementation, the receiving a delay quantization parameter of a common RTD includes: receiving a control signal, where the control signal carries the delay quantization parameter of the common RTD.

In a possible implementation, the receiving a delay quantization parameter of a common RTD includes: receiving a SIB transmitted through a DL-SCH, where the SIB carries the delay quantization parameter of the common RTD.

In a possible implementation, the SIB includes a common RTD field, and a value of the common RTD field is used to indicate the delay quantization parameter of the common RTD.

In a possible implementation, the delay quantization parameter further includes a second quantization parameter, and the second quantization parameter is used to indicate an angle-related delay.

In a possible implementation, the method further includes: receiving a second quantization parameter updated based on an angle or a time period, where the updated second quantization parameter is used to update the angle-related delay.

In a possible implementation, the receiving a second quantization parameter updated based on an angle or a time period includes: receiving an updated broadcast signal, where the updated broadcast signal carries the second quantization parameter updated based on the angle or the time period.

In a possible implementation, the receiving a second quantization parameter updated based on an angle or a time period includes: receiving an updated control signal, where the updated control signal carries the second quantization parameter updated based on the angle or the time period.

Optionally, for the first quantization parameter and the second quantization parameter in the third aspect, refer to content of the first quantization parameter and the second quantization parameter in the first aspect. Details are not described herein again.

According to a fourth aspect, a method for processing a round trip delay is provided, including: sending a delay quantization parameter of a common RTD, where the delay quantization parameter includes a first quantization parameter, the first quantization parameter is used to indicate a height-related delay, and the delay quantization parameter is used to obtain the common RTD.

In a possible implementation, the sending a delay quantization parameter of a common RTD includes: sending a broadcast signal, where the broadcast signal carries the delay quantization parameter.

In a possible implementation, the sending a broadcast signal includes: sending the broadcast signal through a broadcast channel or a data channel.

In a possible implementation, the sending a delay quantization parameter of a common RTD includes: transmitting a SIB through a DL-SCH, where the SIB carries the delay quantization parameter of the common RTD.

In a possible implementation, the SIB includes a common RTD field, and a value of the common RTD field is used to indicate the delay quantization parameter of the common RTD.

In a possible implementation, the sending the delay quantization parameter includes: sending a control signal, where the control signal carries the delay quantization parameter.

In a possible implementation, the delay quantization parameter further includes a second quantization parameter, and the second quantization parameter is used to indicate an angle-related delay quantized value.

In a possible implementation, the method further includes: sending a second quantization parameter updated based on an angle or a time period.

In a possible implementation, the sending a second quantization parameter updated based on an angle or a time period includes: sending an updated broadcast signal, where the updated broadcast signal carries the second quantization parameter updated based on the angle or the time period.

In a possible implementation, the sending a second quantization parameter updated based on an angle or a time period includes:
sending an updated control signal, where the updated control signal carries the second quantization parameter updated based on the angle or the time period.

Optionally, for the first quantization parameter and the second quantization parameter in the fourth aspect, refer to content of the first quantization parameter and the second quantization parameter in the second aspect. Details are not described herein again.

According to a fifth aspect, a communications apparatus is provided, configured to perform the method according to any one of the first aspect or the possible implementations of the first aspect. Optionally, the apparatus includes a unit configured to perform the method in any one of the first aspect or the possible implementations of the first aspect.

According to a sixth aspect, another communications apparatus is provided, configured to perform the method according to any one of the second aspect or the possible implementations of the second aspect. Specifically, the apparatus includes a unit configured to perform the method in any one of the second aspect or the possible implementations of the second aspect.

According to a seventh aspect, another communications apparatus is provided, and the apparatus includes a transceiver, a memory, and a processor. The transceiver, the memory, and the processor communicate with each other through an internal connection channel. The memory is configured to store instructions. The processor is configured to execute the instructions stored in the memory, to control a receiver to receive a signal, and control a transmitter to send a signal. In addition, when the processor executes the instructions stored in the memory, the processor is enabled to perform the method in any one of the first aspect or the possible implementations of the first aspect.

According to an eighth aspect, another communications apparatus is provided, and the apparatus includes a transceiver, a memory, and a processor. The transceiver, the memory, and the processor communicate with each other through an internal connection channel. The memory is configured to store instructions. The processor is configured to execute the instructions stored in the memory, to control a receiver to receive a signal, and control a transmitter to send a signal. In addition, when the processor executes the instructions stored in the memory, the processor is enabled to perform the method in any one of the second aspect or the possible implementations of the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

According to a ninth aspect, a communications system is provided. The system includes the apparatus in any one of the fifth aspect or the possible implementations of the fifth aspect and the apparatus in any one of the sixth aspect or the possible implementations of the sixth aspect. Alternatively, the system includes the apparatus in any one of the seventh aspect or the possible implementations of the seventh aspect and the apparatus in any one of the eighth aspect or the possible implementations of the eighth aspect.

According to a tenth aspect, a computer program (product) is provided. The computer program (product) includes computer program code, and when the computer program code is run by a computer, the computer is enabled to perform the methods in the foregoing aspects.

According to an eleventh aspect, a readable storage medium is provided. The readable storage medium stores a program or instructions, and when the program or the instructions is/are run on a computer, the methods in the foregoing aspects are performed.

According to a twelfth aspect, a chip is provided. The chip includes a processor, configured to invoke, from a memory, and run instructions stored in the memory, so that a communications device in which the chip is installed performs the methods in the foregoing aspects.

According to a thirteenth aspect, another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

According to a fourteenth aspect, a communications apparatus is provided. The communications apparatus includes: a receiving module, configured to receive a delay quantization parameter of a common RTD, where the delay quantization parameter includes a first quantization parameter, and the first quantization parameter is used to indicate a height-related delay; and an obtaining module, configured to obtain the common RTD based on the delay quantization parameter.

In a possible implementation, the receiving module is configured to receive a broadcast signal, where the broadcast signal carries the delay quantization parameter of the common RTD.

In a possible implementation, the receiving module is configured to receive the broadcast signal through a broadcast channel or a data channel.

In a possible implementation, the receiving module is configured to receive a control signal, where the control signal carries the delay quantization parameter of the common RTD.

In a possible implementation, the receiving module is configured to receive a SIB transmitted on a DL-SCH, where the SIB carries the delay quantization parameter of the common RTD.

In a possible implementation, the SIB includes a common RTD field, and a value of the common RTD field is used to indicate the delay quantization parameter of the common RTD.

In a possible implementation, the receiving module is further configured to receive a second quantization parameter updated based on an angle or a time period; and the obtaining module is further configured to update an angle-related delay based on the updated second quantization parameter.

In a possible implementation, the receiving module is configured to receive an updated broadcast signal, where the updated broadcast signal carries the second quantization parameter updated based on the angle or the time period.

Optionally, for the first quantization parameter and the second quantization parameter in the fourteenth aspect, refer to content of the first quantization parameter and the second quantization parameter in the first aspect. Details are not described herein again.

According to a fifteenth aspect, a communications apparatus is provided. The communications apparatus includes: an obtaining module, configured to obtain a delay quantization parameter corresponding to a common RTD, where the delay quantization parameter includes a first quantization parameter, and the first quantization parameter is used to indicate a height-related delay; and a sending module, configured to send the delay quantization parameter.

In a possible implementation, the sending module is configured to send a broadcast signal, where the broadcast signal carries the delay quantization parameter.

In a possible implementation, the sending module is configured to send the broadcast signal through a broadcast channel or a data channel.

In a possible implementation, the sending module is configured to transmit a SIB through a DL-SCH, where the SIB carries the delay quantization parameter of the common RTD.

In a possible implementation, the sending module is configured to send a control signal, where the control signal carries the delay quantization parameter.

In a possible implementation, the obtaining module is further configured to update the second quantization parameter based on an angle or a time period; and the sending module is further configured to send the second quantization parameter updated based on the angle or the time period.

In a possible implementation, the sending module is configured to send an updated broadcast signal, where the updated broadcast signal carries the second quantization parameter updated based on the angle or the time period.

In a possible implementation, the sending module is configured to send an updated control signal, where the updated control signal carries the second quantization parameter updated based on the angle or the time period.

Optionally, for the first quantization parameter and the second quantization parameter in the fifteenth aspect, refer to content of the first quantization parameter and the second quantization parameter in the first aspect. Details are not described herein again.

DESCRIPTION OF EMBODIMENTS

Figure 1:
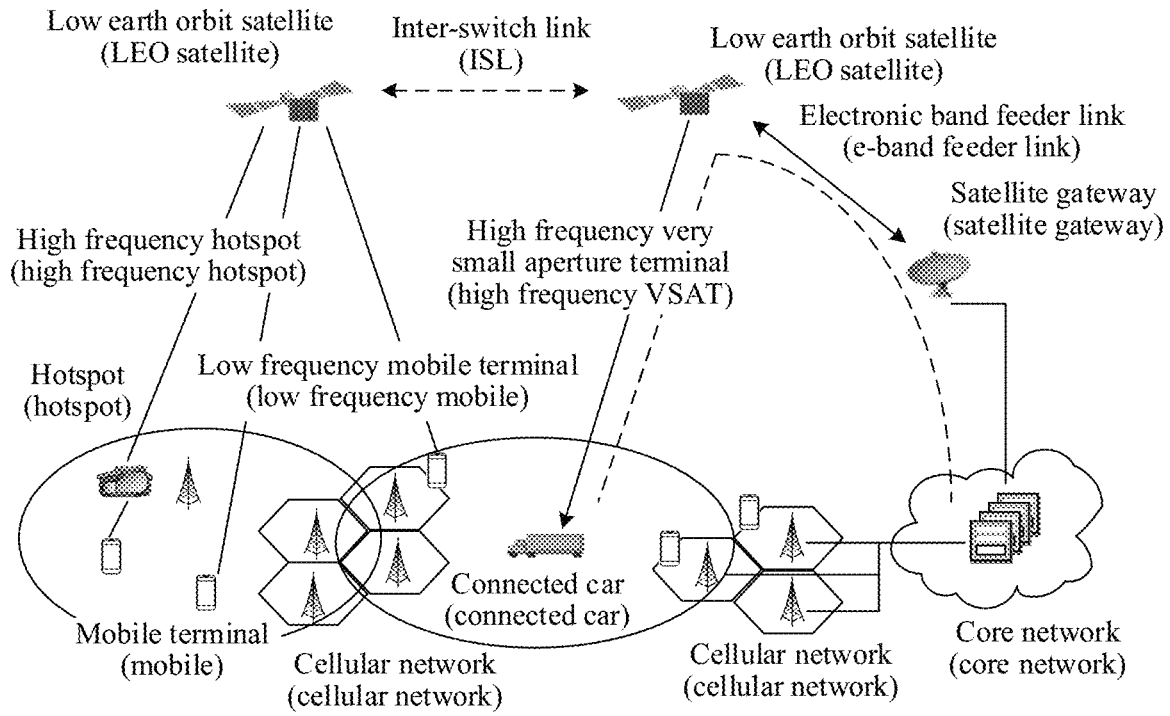
FIG. 1 is a schematic diagram of a system architecture according to an embodiment of this application.

Terms used in implementations of this application are merely intended to explain specific embodiments of this application, and are not intended to limit this application.

A non-terrestrial base station, such as a satellite and an unmanned aerial vehicle, can provide wider coverage than a ground base station, and is not vulnerable to natural disasters or external force. Therefore, the non-terrestrial base station attracts more attention. A satellite is used as an example. In a satellite communications system, satellite types are usually classified into low earth orbits (LEO), medium earth orbits (MEO), high earth orbits based on a height, where the high earth orbit is also referred to as a geostationary earth orbit, and high altitude platform stations (HAPS). A high earth orbit satellite is usually geostationary, and one or a few high earth orbit satellites may provide communication for a fixed area. A medium earth orbit satellite and a low earth orbit satellite have their own moving tracks, and usually a plurality of satellites are required to collaborate to provide communication for a fixed area. Although an unmanned aerial vehicle is not as high as the satellite, the unmanned aerial vehicle can still provide wider coverage than a ground base station. If non-terrestrial base stations, such as satellites and unmanned aerial vehicles, are introduced to a fifth generation mobile communication network (5G), non-terrestrial communications services can be provided for areas, such as oceans and forests, that cannot be covered by ground communication networks and 5G communication reliability can be enhanced, for example, ensuring better communications services for aircraft, trains, and users on these vehicles. In addition, more data transmission resources can be provided for the 5G communication to increase a network rate. Therefore, it is an inevitable trend for the 5G communication to support communication between ground base stations and non-terrestrial base stations such as satellites and unmanned aerial vehicles. The non-terrestrial base stations have great benefits in terms of wide coverage, reliability, multi-connectivity, and high throughput.

However, a current non-terrestrial base station such as a satellite or an unmanned aerial vehicle is greatly different from a ground base station in terms of a communications protocol, especially the satellite. A common mobile terminal such as a mobile phone can only support communication with the ground base station, and only a dedicated satellite mobile phone can communicate with the satellite. Therefore, in the 5G communication, a satellite communication process needs to be redesigned, so that the satellite communication process can be converged with existing ground communication, without increasing costs and complexity of the mobile terminal. In this way, during communication, the mobile terminal only needs to select an appropriate base station for communication based on a corresponding requirement.

In order to realize convergence of ground communication and non-terrestrial base stations such as a satellite and an unmanned aerial vehicle, it is key to deal with a problem of overlong RTD in the communications system. For example, an RTD of a geostationary orbit (GEO) satellite may reach hundreds of milliseconds. However, in a 5G new radio access technology (NR) system, an RTD does not exceed 1 millisecond. Therefore, a random access process of NR needs to be redesigned to support satellite communication.

In long term evolution (LTE) and NR random access processes, a terminal sends a random access signal to a base station, and the base station estimates initial timing advance (TA) by using the signal, and notifies the terminal by using a TA instruction during an access response. The TA refers to a time compensation amount from time when the terminal receives a downlink signal to time when the terminal sends an uplink signal. When sending a signal, different terminals add a corresponding TA to ensure that all signals can be synchronized in the terminals, and a TA error does not exceed a length of a cyclic prefix (CP). The length of the CP needs to be equal to a maximum RTD difference in a cell. Because a shortest distance between a user and the base station is 0, the length of the CP is a round trip time interval of signal transmission when an edge user communicates with the base station. Because a satellite base station has a long distance and a long delay, if a current random access mechanism is directly used to indicate timing advance and design a frame structure, huge overheads are caused. In a related technology, a mobile terminal solves this problem by compensating the common RTD in advance, but direct broadcasting of the common delay causes relatively large resource overheads.

Therefore, the embodiments of this application provide a method for processing a round trip delay. The method relates to a manner of processing the common RTD to reduce resource overheads. Optionally, the method may be applied to a system architecture of a mobile satellite communications system shown in FIG. 1. As shown in FIG. 1, the system includes two low earth orbit satellites (LEO satellite), one satellite gateway, one connected car, a plurality of transmitter towers, one hotspot, and a plurality of mobile terminals (mobile). The mobile terminals include a low frequency mobile terminal and a high frequency very small aperture terminal (high frequency VSAT), the hotspot is a high frequency hotspot, and two low earth orbit satellites communicate with each other through an inter-switch link (ISL). One of the two low earth orbit satellites communicates with the satellite gateway through an electronic band feeder link (e-band feeder link). The system includes a cellular network and a core network, and a satellite base station and a ground base station jointly provide communications services for various mobile terminals. In an access process of a mobile terminal, the satellite base station needs to indicate the mobile terminal to send the TA corresponding to a signal, to ensure that information sent by all mobile terminals is synchronized at a base station end. However, the technical solutions provided in the embodiments of this application are applied to a manner in which the satellite base station notifies the mobile terminal of the TA. Certainly, in addition to a non-terrestrial base station such as a satellite, the method provided in this embodiment of this application is also applicable to other non-terrestrial base stations such as an unmanned aerial vehicle, and an implementation principle is similar to that of the satellite. In the embodiments of this application, only the satellite is used as an example for description.

Figure 2:
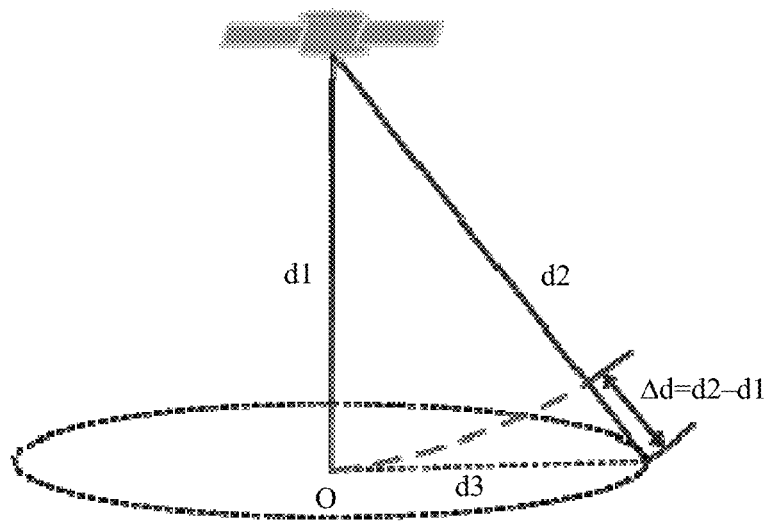
FIG. 2 is a schematic diagram of a communication scenario according to an embodiment of this application.

Before the method provided in the embodiments of this application is described in detail, following communication scenarios are first described. In a first communication scenario, a beam moves as a satellite moves, as shown in FIG. 2. Because a coverage area of a satellite beam is large, an illumination angle relative to the ground may be approximately unchanged. That is, d1 (d1 is a one-way delay of satellite-to-ground communication) in FIG. 2 remains unchanged. In this case, because the illumination angle relative to the ground may be approximately unchanged, a common RTD may be decomposed into a height-related delay, and an angle-related delay may be ignored. As shown in FIG. 2, when the satellite passes the top of a mobile terminal, the mobile terminal located at a point O is the mobile terminal corresponding to the satellite, and delay duration between the mobile terminal and a satellite base station is minimum delay duration, namely, the common RTD. In FIG. 2, the point O is a point at which the satellite is perpendicular to the ground, the common RTD in a cell corresponds to a delay of 2×d1, other mobile terminals have an extra RTD on the basis of this, and a maximum RTD of an edge mobile terminal corresponds to a delay of 2×(d1+Δd). In view of a problem of large RTD in satellite communication, if the mobile terminal compensates the common RTD 2×d1 in advance during access, a round trip delay difference of signals sent by all mobile terminals does not exceed 2×Δd, and the value is far smaller than the common RTD. The common RTD may be notified to the mobile terminal in a broadcast manner. During beam design, a size of the beam needs to be controlled to ensure that 2×Δd does not exceed a CP length in NR. In this way, an existing random access signal can be used.

Figure 3:
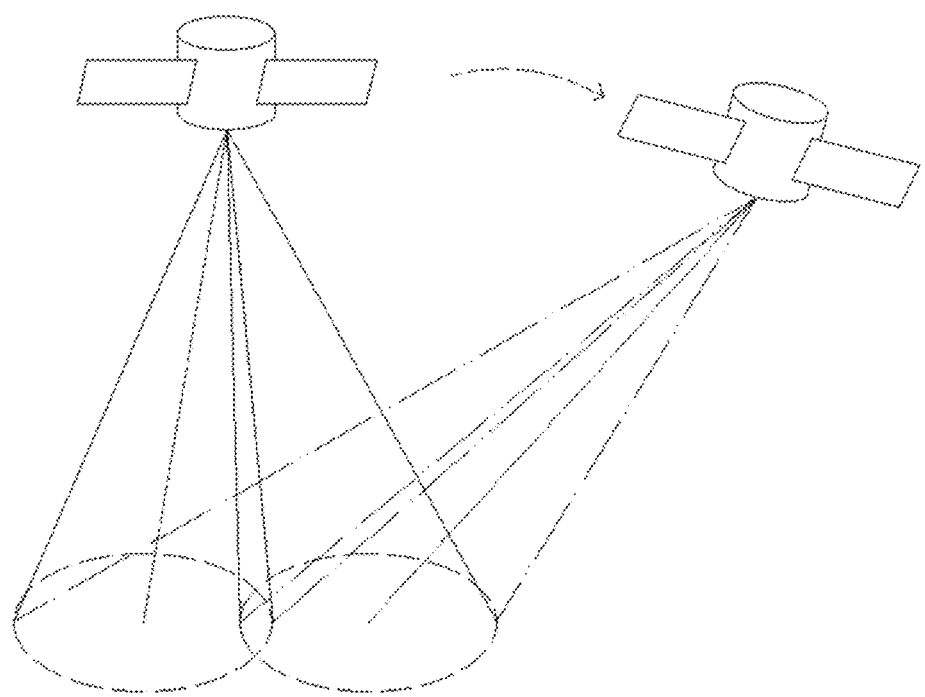
FIG. 3 is a schematic diagram of a communication scenario according to an embodiment of this application.

In a second communication scenario, the beam changes an angle as the satellite moves, and provides services for a fixed area on the ground for a long time. This communication manner is also referred to as an earth-fixed mode, as shown in FIG. 3. Compared with FIG. 2, in FIG. 3, a common RTD and a maximum delay difference are related to the angle of the beam, and change with a change of the beam. The common RTD may be up to hundreds of milliseconds. If the common RTD is directly broadcast, large resource overheads are introduced. Therefore, a new solution needs to be considered to reduce resource overheads of broadcasting the common RTD.

For a ground user, to avoid interference, an RTD at a cell edge cannot exceed the CP. In a satellite scenario, a maximum ΔRTD of a short-distance terminal and a long-distance terminal cannot exceed the CP. In the earth-fixed mode, the ΔRTD of the terminal is the largest when an elevation angle of the satellite is the maximum or the minimum. If it is designed that 2×(d2,1−d1,1) and 2×(d2,5−d1,5) do not exceed the CP, the terminal needs to compensate comRTD (θ) (namely, the common RTD) at a current elevation angle θ at different elevation angles of the satellite. In this way, it can be ensured that a remaining ΔRTD does not exceed the CP, to avoid interference.

Figure 4:
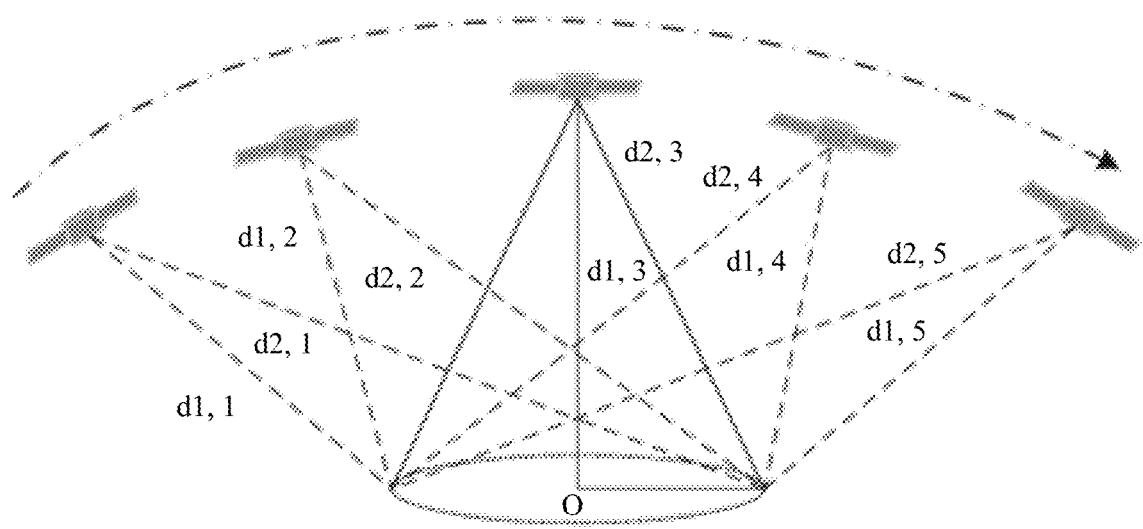
FIG. 4 is a schematic diagram of a communication scenario according to an embodiment of this application.

In the earth-fixed mode, according to a moving track of the satellite, the minimum comRTD is reached at a specific elevation angle, which is referred as a minRTD herein. As shown in FIG. 4, minRTD=d1, 3, and the minRTD corresponds to an elevation angle of 90 degrees. As the elevation angle of the satellite increases or decreases, comRTD increases, and comRTD at different angles may be decomposed into comRTD(θ)=minRTD+oRTD(θ). oRTD(θ) represents a change amount of comRTD on the basis of minRTD at the elevation angle θ, and the change amount varies with angle and a range of the change amount is far less than minRTD. minRTD is mainly determined by a height. In this embodiment, minRTD is used as a height-related delay, namely, a first quantization parameter, and oRTD (θ) is used as an angle-related delay, namely, a second quantization parameter. A variation magnitude of minRTD is greater than that of oRTD (θ).

Figure 5:
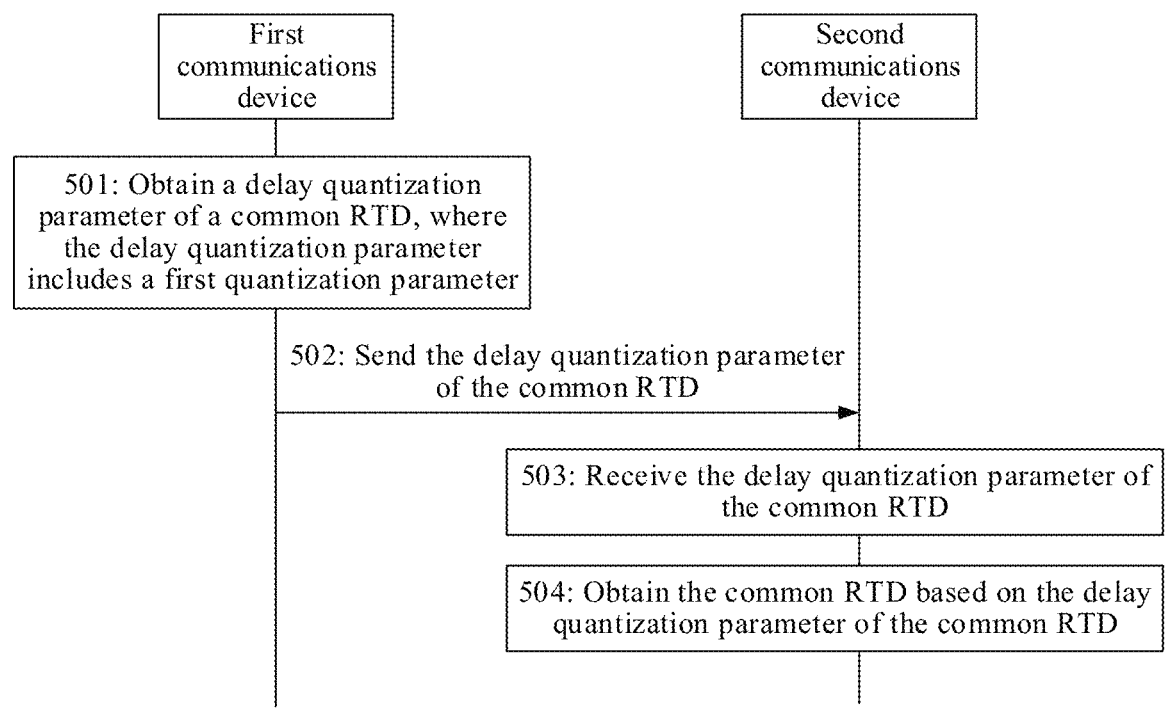
FIG. 5 is a flowchart of a method for processing a round trip delay according to an embodiment of this application.

Based on analysis of the foregoing two scenarios, as shown in FIG. 5, an embodiment of this application provides a method for processing a round trip delay. In this method, a common RTD is decomposed, a delay obtained through decomposition is quantized to obtain a quantization parameter, and resource overheads are reduced by sending the quantization parameter. Optionally, the method may be implemented through interaction between a first communications device and a second communications device. For example, the first communications device may be a non-terrestrial base station such as a satellite or an unmanned aerial vehicle, and the second communications device is a mobile terminal. That the method is applied to the scenario shown in FIG. 2 is used as an example. To be specific, the common RTD is decomposed into a height-related delay without considering an angle-related delay. Referring to FIG. 5, the method includes the following steps.

In step 501, the first communications device obtains a delay quantization parameter of a common RTD, where the delay quantization parameter includes a first quantization parameter.

The first quantization parameter is used to indicate a height-related delay. The height may be a height at which the first communications device is located, or may be considered as a height from the first communications device to the ground (or a sea level). For example, if the height at which the first communications device is located is 600 km (kilometer), the height in this step is 600 km, and the first quantization parameter is used to indicate a delay related to 600 km.

Optionally, although heights of some communications devices are different, delays in a specific orbit range may be considered as one type as a delay difference is relatively small. Therefore, the height in this step may alternatively be several heights close to the height at which the first communications device is located. In other words, the specific orbit range is used as the height in this step. For example, if the height at which the first communications device is located is 600 km, and 600 km is within a height range of 600 km to 650 km, the height in this step may refer to the height range of 600 km to 650 km, and the first quantization parameter is used to indicate a delay related to the height of 600 km to 650 km.

In addition, regardless of whether the height in this step is a height value or a height range, the height may be a height relative to the ground. In other words, the height in this application uses the ground as a reference. Certainly, in another application scenario of non-terrestrial communication, another reference may be further used for the height. This is not limited in this embodiment of this application.

For example, the first communications device is a satellite base station. The satellite base station may determine, based on a height at which the satellite base station is located, a common RTD for communication between the satellite base station and the ground, and further obtain a delay quantization parameter of the common RTD based on the common RTD.

Optionally, the first quantization parameter includes but is not limited to the following three cases, and an obtaining manner in each case is as follows.

In a first case of the first quantization parameter, the first quantization parameter is a delay parameter, different heights correspond to different delay parameters, the different delay parameters correspond to a same time quantization unit, and the delay parameter is obtained based on the height-related delay and the time quantization unit.

It should be understood that the foregoing different heights may refer to heights with different height values. For example, 100 km and 200 km are considered as different heights. Optionally, different heights may also refer to heights in different height ranges. For example, 100 km and 110 km are considered as a same height range, and 200 km and 220 km are considered as a same height range. However, the two height ranges are considered as different heights.

In addition, the foregoing time quantization unit is a minimum time value for quantizing the delay. For example, the time quantization unit is 4 ms. In other words, the delay is quantized in a unit of 4 ms. For another example, the time quantization unit is 1 s. In other words, a delay is quantized in a unit of 1 s. The time quantization unit may be set based on a communication scenario, or may be set based on experience. This is not limited in this embodiment of this application.

Optionally, an obtaining manner of the first quantization parameter in the first case is: determining a current orbit height, obtaining a common RTD at the current orbit height, determining an orbit height-related delay based on the common RTD, and determining the delay parameter based on the orbit height-related delay and the time quantization unit.

Optionally, when the delay parameter is determined based on the orbit height-related delay and the time quantization unit, a quotient obtained by dividing the orbit height-related delay by the time quantization unit may be used as the delay parameter.

In addition to obtaining the delay parameter in the foregoing manner, the delay parameter at the current height may be directly obtained according to a correspondence between the delay parameter and the height. The correspondence between the delay parameter and the height may be predetermined and stored on a first communications device side.

For example, a table of the correspondence between the delay parameter and the height is queried based on the current height, to obtain a delay parameter at the current height. The correspondence table records delay parameters corresponding to different heights, and each delay parameter corresponds to a height-related delay.

Optionally, when the delay parameter is determined based on the orbit height-related delay and the time quantization unit, a product of a quotient obtained by dividing the orbit height-related delay by the time quantization unit and a reference coefficient is used as the delay parameter. For a manner in which the reference coefficient is used, different heights may correspond to a same reference coefficient.

Certainly, different heights may alternatively correspond to different reference coefficients, so that different heights may be distinguished, to increase quantization precision of the delay. For example, the obtained quotient is 4. If the height is 400 km and a corresponding reference coefficient is 1, the delay parameter is 4. If the height is 800 km and a corresponding reference coefficient is 2, the delay parameter is 8. The reference coefficient may be determined based on a communication scenario or a height, or may be determined based on experience. This is not limited in this embodiment of this application.

In a second case of the first quantization parameter, the first quantization parameter is a delay index, and the delay index is obtained based on the height-related delay.

Optionally, an obtaining manner of the first quantization parameter in the second case is: determining a current height, and obtaining the delay index at the current height based on a correspondence among the delay index, the height-related delay, and the height.

For example, a table of the correspondence among the delay index, the height-related delay, and the height is queried based on the current height, to obtain the delay index at the current height.

It is not difficult to see that, in the second case, considering that the satellite height is not evenly increased, and a satellite height level is limited, different satellite heights directly correspond to different delay indexes. Compared with the first case, in the second case, relatively simple signaling may be used to accurately correspond to the height-related delay.

In a third case of the first quantization parameter, the first quantization parameter includes a level-1 parameter and a level-2 parameter, the level-1 parameter is used to indicate a communications device type, the level-2 parameter is used to indicate a height, and a combination of the level-1 parameter and the level-2 parameter is used to indicate a height-related delay.

Optionally, an obtaining manner of the first quantization parameter in the third case is: determining a current height and the communications device type, and determining the level-1 parameter and the level-2 parameter that correspond to the current height and the communications device type based on a correspondence between the level-1 parameter and the communications device type and a correspondence between the level-2 parameter and the height.

For example, both the correspondence between the level-1 parameter and the communications device type and the correspondence between the level-2 parameter and the height may be represented by using a correspondence table. Therefore, the level-1 parameter and the level-2 parameter may be obtained through querying the correspondence table.

For details about the foregoing three manners of obtaining the first quantization parameter, refer to subsequent example descriptions. Details are not described herein.

In addition, it should be noted that the process of obtaining the delay quantization parameter of the common RTD in the step 501 does not need to be performed each time when the method is performed. In other words, the step 501 may not need to be performed in the method provided in this embodiment of this application. However, when the first communications device has learned the delay quantization parameter of the common RTD, step 502 is directly performed. That is, a broadcast signal is directly sent.

In step 502, the first communications device sends the delay quantization parameter of the common RTD.

In a possible implementation, that the first communications device sends the delay quantization parameter of the common RTD includes:

sending the broadcast signal, where the broadcast signal carries the delay quantization parameter of the common RTD.

In a possible implementation, the broadcast signal may be sent through a broadcast channel or a data channel.

For example, that the first communications device sends the delay quantization parameter of the common RTD includes: transmitting a SIB through a DL-SCH, where the SIB carries the delay quantization parameter of the common RTD.

In a possible implementation, the SIB includes a common RTD field, and a value of the common RTD field is used to indicate the delay quantization parameter of the common RTD. For example, an RTD field is added to a SIB2, and the RTD field is used to indicate the delay quantization parameter of the common RTD. Certainly, in addition to extending a new field, an existing field may be used to indicate the delay quantization parameter of the common RTD. This is not limited in this embodiment of this application.

Moreover, in addition to being carried in the broadcast signal, the common RTD may be carried in another manner, provided that a broadcast function can be implemented. This is not limited in this embodiment of this application.

For example, that the first communications device sends the delay quantization parameter of the common RTD includes:

sending a control signal, where the control signal carries the delay quantization parameter of the common RTD.

Regardless of which bearer manner is used, because the common RTD is quantized, the delay quantization parameter obtained after quantization is less than the common RTD, and therefore resource overheads of broadcasting the delay quantization parameter are less than those of directly broadcasting the common RTD. For example, the common RTD is 16 ms, the delay quantization parameter includes the first quantization parameter, and the first quantization parameter is a delay parameter with value 4. In this case, resource overheads for carrying a parameter with value 16 in the broadcast signal are greater than those for carrying a parameter with value 4. In addition, a maximum common RTD of some satellites may reach hundreds of milliseconds, and resource overheads of directly broadcasting the common RTD are higher. Resource overheads can be reduced by using the method provided in this embodiment of this application.

In step 503, the second communications device receives the delay quantization parameter of the common RTD.

In a possible implementation, the second communications device receives the broadcast signal in a manner in which the first communications device sends the broadcast signal. For example, the second communications device receives the delay quantization parameter of the common RTD includes: receiving the SIB transmitted through the DL-SCH, where the SIB carries the delay quantization parameter of the common RTD.

In a possible implementation, the SIB includes a common RTD field, and a value of the common RTD field is used to indicate the delay quantization parameter of the common RTD.

In a possible implementation, if the first communications device sends the common RTD in a manner of sending the control signal through the control channel, the second communications device receives the control signal, to obtain the common RTD carried in the control signal.

In step 504, the second communications device obtains the common RTD based on the delay quantization parameter of the common RTD.

Optionally, the obtaining the common RTD based on the delay quantization parameter of the common RTD in the step 504 includes: obtaining the height-related delay based on the first quantization parameter in the delay quantization parameter, and obtaining the common RTD based on the height-related delay.

Based on the foregoing three cases of the first quantization parameter, the obtaining the height-related delay based on the first quantization parameter also includes the following cases.

In a first manner of obtaining the height-related delay, the delay parameter and the time quantization unit are combined to determine the height-related delay at a height corresponding to the delay parameter. For example, the delay parameter is multiplied by the time quantization unit to obtain the height-related delay. For another example, if there is a reference coefficient, the delay parameter is divided by the reference coefficient, and an obtained quotient is multiplied by the time quantization unit, to obtain the height-related delay.

Optionally, in addition to the foregoing manner of obtaining the height-related delay, the height-related delay may also be obtained according to a correspondence between the delay parameter and the height-related delay.

For example, a second communications device side stores a table of the correspondence between the delay parameter and the height-related delay. After receiving the broadcast signal, the second communications device side obtains the first quantization parameter in the broadcast signal through decoding. Because the first quantization parameter is the delay parameter, the table of the correspondence between the delay parameter and the height-related delay is queried, to obtain the height-related delay.

In a second manner of obtaining the height-related delay, the height-related delay indicated by the delay index carried in the broadcast signal is determined according to a correspondence between the delay index and the height-related delay.

For example, a second communications device side stores a table of the correspondence between the delay index and the height-related delay. After receiving the broadcast signal, the second communications device side obtains the first quantization parameter in the broadcast signal through decoding. Because the first quantization parameter is the delay index, the table of the correspondence between the delay index and the height-related delay is queried, to obtain the height-related delay.

In a third manner of obtaining the height-related delay, the level-1 parameter and the level-2 parameter are combined, and the height-related delay is determined according to a correspondence among the level-1 parameter, the level-2 parameter, and the height-related delay.

For example, a second communications device side stores a table of the correspondence among the level-1 parameter, the level-2 parameter, and the height-related delay. After receiving the broadcast signal, the second communications device side obtains the first quantization parameter in the broadcast signal through decoding. Because the first quantization parameter includes the level-1 parameter and the level-2 parameter, the table of the correspondence among the level-1 parameter, the level-2 parameter, and the height-related delay is queried, to obtain the height-related delay.

According to the method provided in this embodiment of this application, the first quantization parameter is used to indicate the height-related delay, and the first quantization parameter is carried in the broadcast signal or the control signal, so that a communications device that receives the broadcast signal or the control signal can obtain the common RTD based on the first quantization parameter. Compared with directly broadcasting the common RTD, this method can reduce resource overheads. In addition, because resource overheads can be reduced, a feasible condition is provided for convergence between satellite communication and ground communication.

Figure 6:
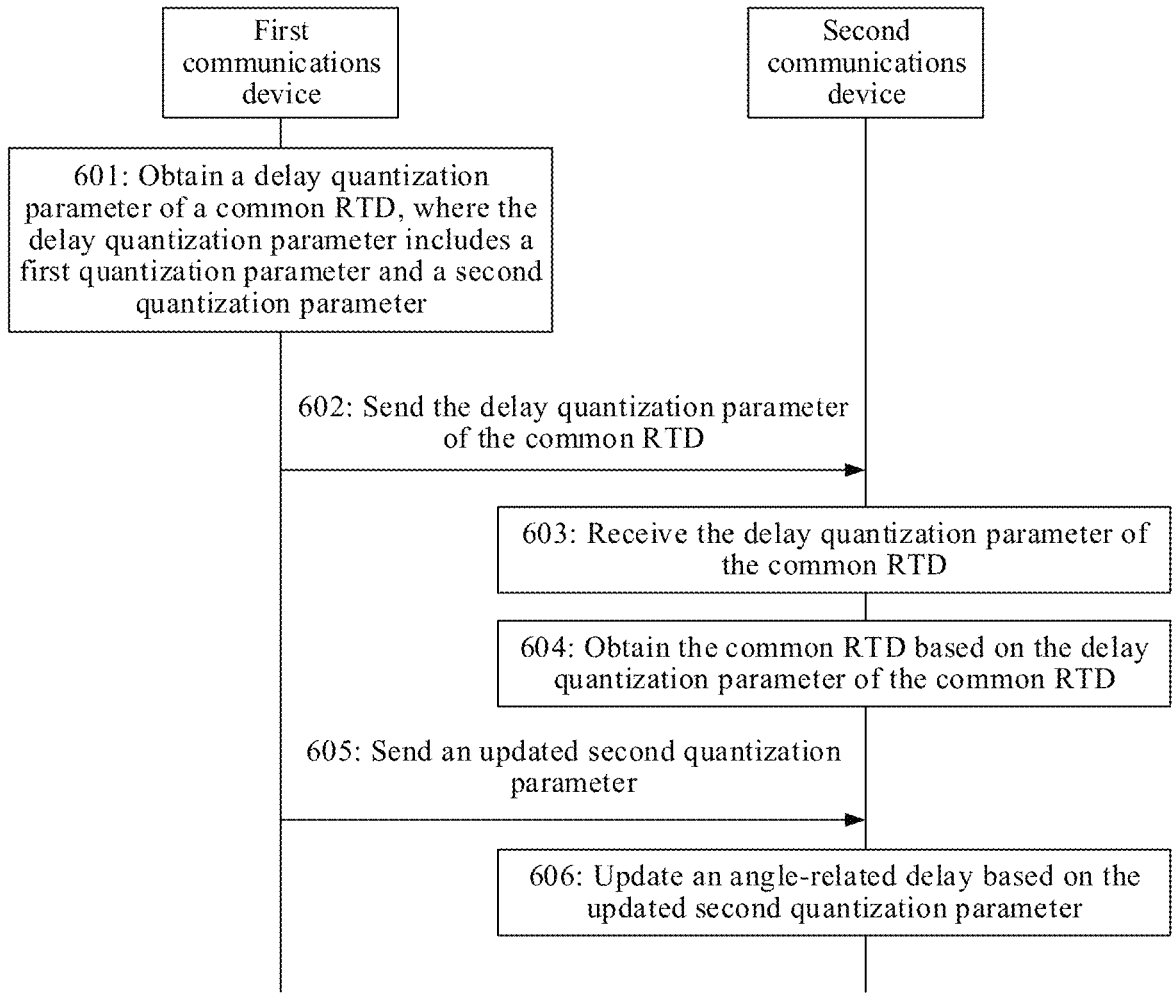
FIG. 6 is a flowchart of a method for processing a round trip delay according to an embodiment of this application.

Based on the foregoing analysis, as shown in FIG. 6, an embodiment of this application provides a method for processing a round trip delay. In this method, a common RTD is decomposed, a delay obtained through decomposition is quantized to obtain a quantization parameter, and resource overheads are reduced by broadcasting a quantization parameter. Optionally, the method may be implemented through interaction between a first communications device and a second communications device. The scenario shown in FIG. 3 is used as an example. Referring to FIG. 6, the method includes the following steps.

In step 601, the first communications device obtains a delay quantization parameter of a common RTD, where the delay quantization parameter includes a first quantization parameter and a second quantization parameter.

The first quantization parameter is used to indicate a height-related delay, and the second quantization parameter is used to indicate an angle-related delay quantized value.

For example, the first communications device is a satellite base station, and the satellite base station may determine, based on a height at which the satellite base station is located, the common RTD for communication between the satellite base station and the ground. The delay quantization parameter of the common RTD is obtained based on the common RTD. For a manner of obtaining the first quantization parameter, refer to related content in the step 501. Details are not described herein again. A manner of obtaining the second quantization parameter includes but is not limited to the following two cases.

In a first case of the second quantization parameter, a same division manner is used for angles at different heights.

In a second case of the second quantization parameter, different division manners are used for angles at different heights.

Optionally, regardless of whether angle division manners at different heights are the same or different, the second quantization parameter may be obtained according to a correspondence between an angle and an angle-related delay.

Figure 7:
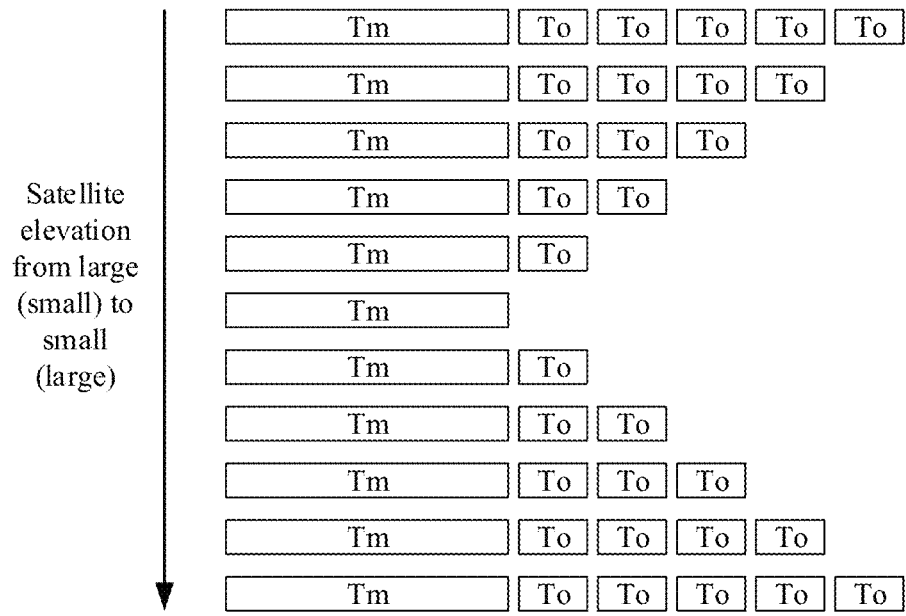
FIG. 7 is a schematic structural diagram of a common RTD according to an embodiment of this application.

In addition, the first quantization parameter and the second quantization parameter may use different time quantization units. For example, in FIG. 7, Tm (a height-related delay) uses a relatively large time quantization unit based on a height change, and To (an angle-related delay) uses a relatively small time quantization unit. Satellites at different heights correspond to different minRTDs (namely, Tm), and an appropriate time quantization unit is used based on a height change range. It should be understood that different time quantization units may be different time quantization units of a same magnitude, for example, all different time quantization units are at a ms (millisecond) level, and only values are different. For example, a time quantization unit of the first quantization parameter is 1 ms, and a time quantization unit of the second quantization parameter is 0.5 ms. Certainly, the different time quantization units may alternatively be time quantization units of different magnitudes. For example, a time quantization unit of the first quantization parameter is s (second), and a time quantization unit of the second quantization parameter is ms.

In step 602, the first communications device sends the delay quantization parameter of the common RTD.

For a manner of sending a broadcast signal in the step 602, refer to related descriptions of the step 502. Details are not described herein again.

In step 603, the second communications device receives the delay quantization parameter of the common RTD.

For a manner of receiving the broadcast signal in the step 603, refer to related descriptions of the step 503. Details are not described herein again.

In step 604, the second communications device obtains the common RTD based on the delay quantization parameter of the common RTD.

Optionally, the obtaining the common RTD based on the delay quantization parameter of the common RTD in the step 604 includes: obtaining the height-related delay based on the first quantization parameter in the delay quantization parameter, obtaining the angle-related delay based on the second quantization parameter in the delay quantization parameter, and obtaining the common RTD based on the height-related delay and the angle-related delay.

For a manner of obtaining the height-related delay based on the first quantization parameter, refer to related content in the step 504. For a manner of obtaining the angle-related delay based on the second quantization parameter, refer to a correspondence between an angle and a delay. For example, the angle-related delay is obtained by querying a table of the correspondence between an angle and a delay.

In step 605, the first communications device sends an updated second quantization parameter.

As the satellite base station moves, an angle changes, and therefore the angle-related delay also changes. Therefore, the method provided in this embodiment of this application further includes a process of updating an angle-related second quantization parameter after the angle is updated. Optionally, the second quantization parameter may be updated based on the angle or a time period. For example, after the angle changes, the first communications device is triggered to send the updated second quantization parameter. For example, the first communications device sends an updated broadcast signal, and the updated broadcast signal carries the updated second quantization parameter. For example, the first communications device sends an updated control signal, and the updated control signal carries the updated second quantization parameter. For another example, the first communications device is triggered, at an interval of a specific time period, to send the updated broadcast signal or the updated control signal.

When the second quantization parameter is updated based on the time period, the satellite base station and the mobile terminal use same timing. After a specific time interval, the satellite base station updates broadcast information of oRTD (namely, To, the angle-related delay), in other words, sends the updated broadcast signal or sends the updated control signal. Correspondingly, the mobile terminal monitors and decodes the broadcast signal or the control signal after a same time interval, to obtain the updated second quantization parameter, namely, the oRTD.

Figure 8:
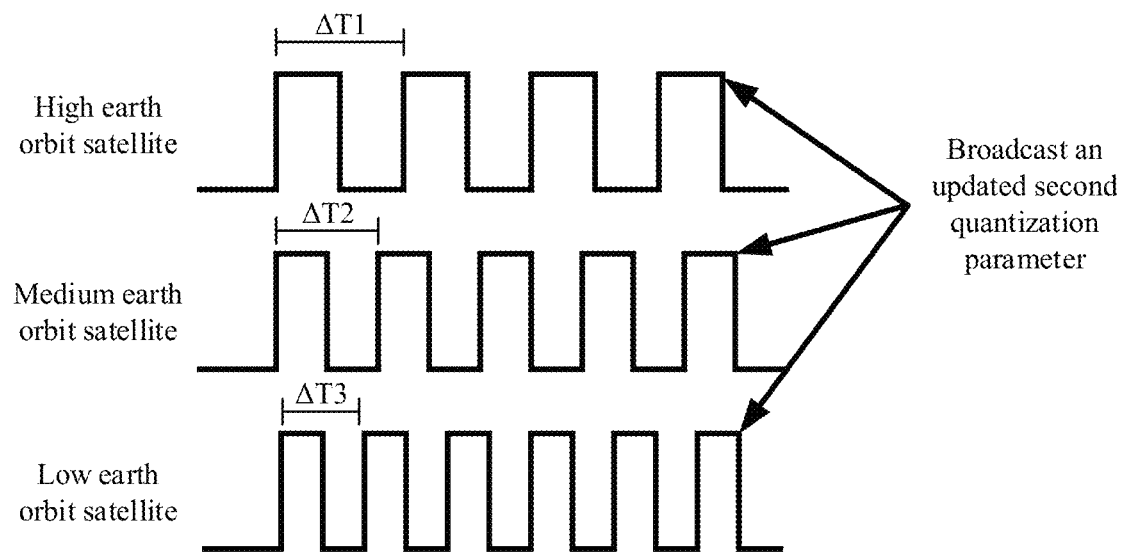
FIG. 8 is a schematic diagram of a time period according to an embodiment of this application.

In a possible implementation, communication devices at different heights correspond to different time periods. As shown in FIG. 8, a time period used by a high earth orbit satellite is $\Delta T1$, a time period used by a medium earth orbit satellite is $\Delta T2$, and a time period used by a low earth orbit satellite is $\Delta T3$. The time period may be set based on an actual situation. This is not limited in this embodiment of this application. In addition, the time period may be fixed, or may be updated based on an actual situation. In other words, the time period may be fixed, or may not be fixed.

In step 606, the second communications device receives the updated second quantization parameter, and updates the angle-related delay based on the updated second quantization parameter.

In a possible implementation, the second communications device receives the updated broadcast signal, decodes the updated broadcast signal, to obtain the updated second quantization parameter carried in the updated broadcast signal, so as to update the angle-related delay based on the updated second quantization parameter.

In a possible implementation, the second communications device receives the updated control signal, decodes the updated control signal, to obtain the updated second quantization parameter carried in the updated control signal, so as to update the angle-related delay based on the updated second quantization parameter.

In the method provided in this embodiment of this application, the first quantization parameter is used to indicate the height-related delay, the second quantization parameter is used to indicate the angle-related delay, and the first quantization parameter and the second quantization parameter are sent, so that a communications device that receives the first quantization parameter and the second quantization parameter can obtain the common RTD based on the received quantization parameters. Compared with directly broadcasting the common RTD, this method can reduce resource overheads. In addition, because resource overheads can be reduced, a feasible condition is provided for convergence between ground communication and a non-terrestrial base station such as a satellite or an unmanned aerial vehicle.

For ease of understanding, the following describes, by using an example, a manner of obtaining the first quantization parameter and the second quantization parameter and a manner of obtaining the common RTD in the embodiment shown in FIG. 5 or FIG. 6.

For the first case of the first quantization parameter, the first quantization parameter is used as the delay parameter, and the table of the correspondence between the delay parameter and the height is shown in the following Table 1:

TABLE 1

| Height (H) | Tm = 4 ms | minRTD |
|---|---|---|
| 600 km | 3 | 12 ms |
| 800 km | 4 | 16 ms |
| 1000 km | 5 | 20 ms |
| 1200 km | 6 | 24 ms |
| ... | | |
| 30000 km | 150 | 600 ms |

It can be learned from Table 1 that satellites at different heights correspond to different minRTDs, and an appropriate time quantization unit is used based on a height change range. As shown in Table 1, a time quantization unit of Tm is 4 ms, and a quantity of Tm broadcast by the satellites at different heights is the delay parameter. The mobile terminal calculates a corresponding minRTD based on a received delay parameter. For example, if the delay parameter carried in the broadcast signal is 4, the mobile terminal may obtain minRTD=4 ms×4=16 ms.

For the second case of the first quantization parameter, the first quantization parameter is used as the delay index, and the table of the correspondence between the delay index and the height is shown in the following Table 2:

TABLE 2

| Height (H) | Index | minRTD |
|---|---|---|
| 300 km | 1 | 6 ms |
| 500 km | 2 | 11 ms |
| 600 km | 3 | 13 ms |
| 1000 km | 4 | 18 ms |
| 1200 km | 5 | 20 ms |
| ... | ... | ... |
| 35768 km | 10 | 541 ms |

Different from the first quantization parameter shown in Table 1, considering that a satellite height is not evenly increased, and a height level of the satellite is limited, in the second case, different heights of the satellite may directly correspond to different delay indexes, and the mobile terminal may obtain, by querying Table 2, a minRTD corresponding to the delay index. For example, if the second quantization parameter is 4, it may be learned, by querying Table 2, that the height-related delay is 18 ms.

For the third case of the first quantization parameter, the first quantization parameter includes the level-1 parameter and the level-2 parameter, and the table of the correspondence among the level-1 parameter, the level-2 parameter, and the height is shown in the following Table 3. The level-1 parameter may be used to indicate a communications device type. For example, satellite types include a high earth orbit, a low earth orbit, a medium earth orbit, a high altitude platform, and the like. The level-2 parameter indicates different heights in different levels of orbits. For example, if a broadcast level-1 parameter is 2 and a broadcast level-2 parameter is 3, the mobile terminal obtains, by querying Table 3, minRTD=20 ms.

TABLE 3

| Satellite type | Level-1 parameter | Level-2 parameter | Height (H) | minRTD |
|---|---|---|---|---|
| High altitude platform (HAPS) | 1 | 0 | 100 km <= H < 200 km | 2 ms |
| | | 1 | 200 km <= H < 300 km | 4 ms |
| Low earth orbit satellite (LEO) | 2 | 0 | 300 km | 6 ms |
| | | 1 | 600 km | 13 ms |
| | | 2 | 1000 km | 18 ms |
| | | 3 | 1200 km | 20 ms |
| | | 4 | 1500 km | 23 ms |
| Medium earth orbit satellite (MEO) | 3 | 0 | 7000 km | 110 ms |
| | | 1 | 10000 km | 150 ms |
| | | 2 | 20000 km | 300 ms |
| | | 3 | 25000 km | 400 ms |
| High earth orbit satellite (GEO) | 4 | — | 35000 km | 541 ms |

For ease of understanding the second quantization parameter and the manner of obtaining the angle-related delay, in this embodiment, the table of the correspondence between the angle and the delay shown in the following Table 4 is used as an example. Table 4 shows oRTD of communications devices at different heights at different angles (for the high earth orbit satellite, oRTD=0). Using an example in which a time quantization unit of Tm is 1 ms, when a low earth orbit satellite at 600 km is in a range of 10° to 30° or 90° to 110°, oRTD=3×1 ms=3 ms. Therefore, with reference to Table 1 and Table 4, comRTD=minRTD+oRTD=12 ms+3 ms=15 ms. In an access process of the mobile terminal, timing advance of 15 ms needs to be compensated in advance. In this solution, the satellite base station only needs to broadcast parameters corresponding to Tm and To, and Tm and To are agreed fixed values. The mobile terminal may estimate corresponding timing advance, to greatly reduce resource overheads of comRTD broadcast.

TABLE 4

| | θ | | | |
|---|---|---|---|---|
| | 10°-30° (90°-110°) | 30°-50° (50°-70°) | 50°-70° (130°-150°) | 70°-90° (150°-170°) |
| 600 km | 3 | 2 | 1 | 0 |
| 800 km | 6 | 4 | 2 | 0 |
| 1000 km | 12 | 6 | 3 | 0 |
| 1200 km | 16 | 8 | 4 | 0 |

In Table 4, different types of satellites use a same angle division manner. Different from Table 4, in the method provided in this embodiment of this application, at different heights, a same angle change causes different oRTD changes. Consequently, a satellite with a lower earth orbit indicates higher oRTD precision. Therefore, in this embodiment, different angle division manners may also be used for different heights, so that the satellites have same oRTD change precision. As shown in Table 5, after moving at a specific angle, the satellite broadcasts an offset based on precision of 1To. After receiving the broadcast signal, the mobile terminal may compensate the comRTD with the precision of 1To. In this manner, the mobile terminal can have same comRTD adjustment precision when communicating with different satellites.

TABLE 5

| 600 km | oRTD (To offset) | 800 km | oRTD (To offset) | 1000 km | oRTD (To offset) | 1200 km | oRTD (To offset) |
|---|---|---|---|---|---|---|---|
| 15°-40° | 3 | 20°-40° | 3 | 30°-45° | 4 | 40°-50° | 5 |
| 40°-65° | 2 | 40°-60° | 2 | 45°-60° | 3 | 50°-60° | 4 |
| 65°-90° | 1 | 60°-80° | 1 | 60°-75° | 2 | 60°-70° | 3 |
| 90°-115° | 1 | 80°-100° | 0 | 75°-90° | 1 | 70°-80° | 2 |
| 115°-140° | 2 | 100°-120° | 1 | 90°-105° | 1 | 80°-90° | 1 |
| 140°-165° | 3 | 120°-140° | 2 | 105°-120° | 2 | 90°-100° | 1 |
|  |  | 140°-160° | 3 | 120°-135° | 3 | 100°-110° | 2 |
|  |  |  |  | 135°-150° | 4 | 110°-120° | 3 |
|  |  |  |  |  |  | 120°-130° | 4 |
|  |  |  |  |  |  | 130°-140° | 5 |

Figure 9:
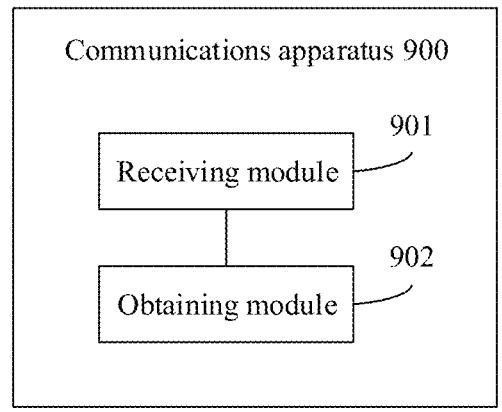
FIG. 9 is a schematic structural diagram of an apparatus for processing a round trip delay according to an embodiment of this application.

Based on a same inventive concept, an embodiment of this application provides a communications apparatus. The communications apparatus may be applied to a communications device end on a user side, for example, a mobile terminal. Referring to FIG. 9, the communications apparatus 900 includes:

a receiving module 901, configured to receive a delay quantization parameter of a common RTD, where the delay quantization parameter includes a first quantization parameter, and the first quantization parameter is used to indicate a height-related delay;

an obtaining module 902, configured to obtain the common RTD based on the delay quantization parameter.

In a possible implementation, the receiving module 901 is configured to receive a broadcast signal, where the broadcast signal carries the delay quantization parameter of the common RTD.

In a possible implementation, the receiving module 901 is configured to receive the broadcast signal through a broadcast channel or a data channel.

In a possible implementation, the receiving module 901 is configured to receive a control signal, where the control signal carries the delay quantization parameter of the common RTD.

In a possible implementation, the receiving module 901 is configured to receive a SIB transmitted on a DL-SCH, where the SIB carries the delay quantization parameter of the common RTD.

In a possible implementation, the SIB includes a common RTD field, and a value of the common RTD field is used to indicate the delay quantization parameter of the common RTD.

In a possible implementation, the delay quantization parameter further includes a second quantization parameter, and the second quantization parameter is used to indicate an angle-related delay.

In a possible implementation, the first quantization parameter and the second quantization parameter use different time quantization units.

In a possible implementation, the first quantization parameter is a delay parameter, different heights correspond to different delay parameters, and the different delay parameters correspond to a same time quantization unit.

The delay index is used to determine, based on the time quantization unit, a height-related delay at a height corresponding to the delay parameter.

In a possible implementation, the first quantization parameter is a delay index, and the delay index is used to indicate a height-related delay at a height corresponding to the delay index.

In a possible implementation, the first quantization parameter includes a level-1 parameter and a level-2 parameter, the level-1 parameter is used to indicate a communications device type, the level-2 parameter is used to indicate a height, and a combination of the level-1 parameter and the level-2 parameter is used to indicate the height-related delay.

In a possible implementation, angle division manners at different heights are the same or different.

In a possible implementation, the receiving module 901 is further configured to receive a second quantization parameter updated based on an angle or a time period.

The obtaining module 902 is further configured to update an angle-related delay based on the updated second quantization parameter.

In a possible implementation, the receiving module 901 is configured to receive an updated broadcast signal, where the updated broadcast signal carries the second quantization parameter updated based on the angle or the time period.

In a possible implementation, the receiving module 901 is configured to receive an updated control signal, where the updated control signal carries the second quantization parameter updated based on the angle or the time period.

In a possible implementation, communication devices at different heights correspond to different time periods.

Figure 10:
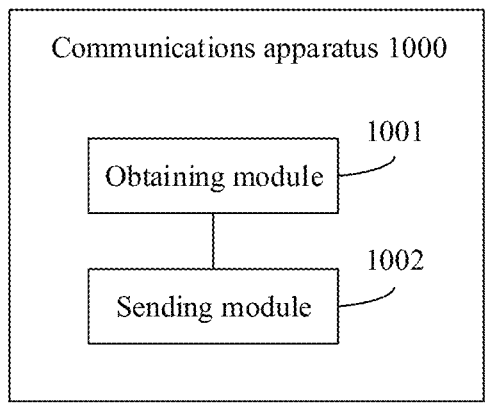
FIG. 10 is a schematic structural diagram of an apparatus for processing a round trip delay according to an embodiment of this application.

An embodiment of this application provides a communications apparatus. The communications apparatus may be applied to a base station end, for example, a satellite or an unmanned aerial vehicle. Referring to FIG. 10, the communications apparatus 1000 includes:

an obtaining module 1001, configured to obtain a delay quantization parameter corresponding to a common RTD, where the delay quantization parameter includes a first quantization parameter, and the first quantization parameter is used to indicate a height-related delay; and a sending module 1002, configured to send the delay quantization parameter.

In a possible implementation, the sending module 1002 is configured to send a broadcast signal, where the broadcast signal carries the delay quantization parameter.

In a possible implementation, the sending module 1002 is configured to send the broadcast signal through a broadcast channel or a data channel.

In a possible implementation, the sending module 1002 is configured to transmit a SIB through a DL-SCH, where the SIB carries the delay quantization parameter of the common RTD.

In a possible implementation, the SIB includes a common RTD field, and a value of the common RTD field is used to indicate the delay quantization parameter of the common RTD.

In a possible implementation, the sending module 1002 is configured to send a control signal, where the control signal carries the delay quantization parameter.

In a possible implementation, the delay quantization parameter further includes a second quantization parameter, and the second quantization parameter is used to indicate an angle-related delay quantized value.

In a possible implementation, the first quantization parameter and the second quantization parameter use different time quantization units.

In a possible implementation, the first quantization parameter is a delay parameter, different heights correspond to different delay parameters, the different delay parameters correspond to a same time quantization unit, and the delay parameter is obtained based on the height-related delay and the time quantization unit.

In a possible implementation, the first quantization parameter is a delay index, and the delay index is obtained based on the height-related delay.

In a possible implementation, the first quantization parameter includes a level-1 parameter and a level-2 parameter, the level-1 parameter is used to indicate a communications device type, the level-2 parameter is used to indicate a height, and a combination of the level-1 parameter and the level-2 parameter is used to indicate the height-related delay.

In a possible implementation, angle division manners at different heights are the same or different.

In a possible implementation, the obtaining module 1001 is further configured to update the second quantization parameter based on an angle or a time period.

The sending module 1002 is further configured to send the second quantization parameter updated based on the angle or the time period.

In a possible implementation, the sending module 1002 is configured to send an updated broadcast signal, where the updated broadcast signal carries the second quantization parameter updated based on the angle or the time period.

In a possible implementation, the sending module 1002 is configured to send an updated control signal, where the updated control signal carries the second quantization parameter updated based on the angle or the time period.

In a possible implementation, communication devices at different heights correspond to different time periods.

It should be understood that, when the apparatuses provided in FIG. 9 and FIG. 10 implement their functions, division into the foregoing functional modules is merely used as an example for description. In actual application, the foregoing functions may be allocated to different functional modules for implementation based on a requirement. In other words, an inner structure of a device is divided into different functional modules, to implement all or some of the functions described above. In addition, the apparatuses provided in the foregoing embodiments and the method embodiments pertain to a same concept. For a specific implementation process thereof, refer to the method embodiments. Details are not described herein again.

Figure 11:
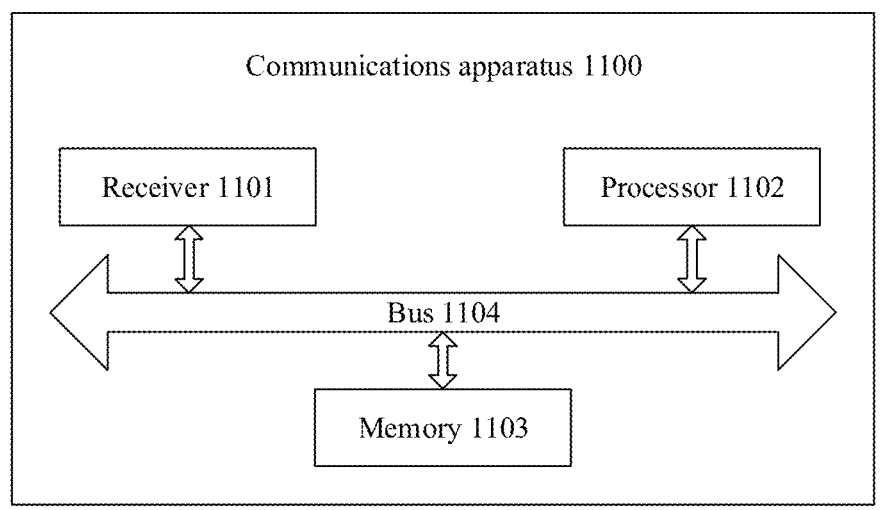
FIG. 11 is a schematic structural diagram of a communications apparatus according to an embodiment of this application.

Based on a same concept, this application provides a communications apparatus. Referring to FIG. 11, the communications apparatus 1100 includes:

a receiver 1101, configured to receive a delay quantization parameter of a common RTD, where the delay quantization parameter includes a first quantization parameter, and the first quantization parameter is used to indicate a height-related delay; and a processor 1102, configured to obtain the common RTD based on the delay quantization parameter.

In a possible implementation, the receiver 1101 is configured to receive a broadcast signal, where the broadcast signal carries the delay quantization parameter of the common RTD.

In a possible implementation, the receiver 1101 is configured to receive the broadcast signal through a broadcast channel or a data channel.

In a possible implementation, the receiver 1101 is configured to receive a control signal, where the control signal carries the delay quantization parameter of the common RTD.

In a possible implementation, the receiver 1101 is configured to receive a SIB transmitted on a DL-SCH, where the SIB carries the delay quantization parameter of the common RTD.

In a possible implementation, the receiver 1101 is further configured to receive a second quantization parameter updated based on an angle or a time period.

The processor 1102 is further configured to update an angle-related delay based on the updated second quantization parameter.

In a possible implementation, the receiver 1101 is configured to receive an updated broadcast signal, where the updated broadcast signal carries the second quantization parameter updated based on the angle or the time period.

In a possible implementation, the receiver 1101 is configured to receive an updated control signal, where the updated control signal carries the second quantization parameter updated based on the angle or the time period.

In an optional implementation, the receiver 1101 may be a wireless or wired receiver, for example, a radio frequency module or an antenna module. The receiver 1101 may include one or more antennas, and may be an array antenna or the like.

In an optional implementation, the communications apparatus 1100 further includes a memory 1103. The receiver 1101, the processor 1102, and the memory 1103 communicate with each other through a bus 1104, or may communicate in another manner such as wireless transmission. The processor 1102 is configured to control the receiver 1101 to perform a receiving operation.

Figure 12:
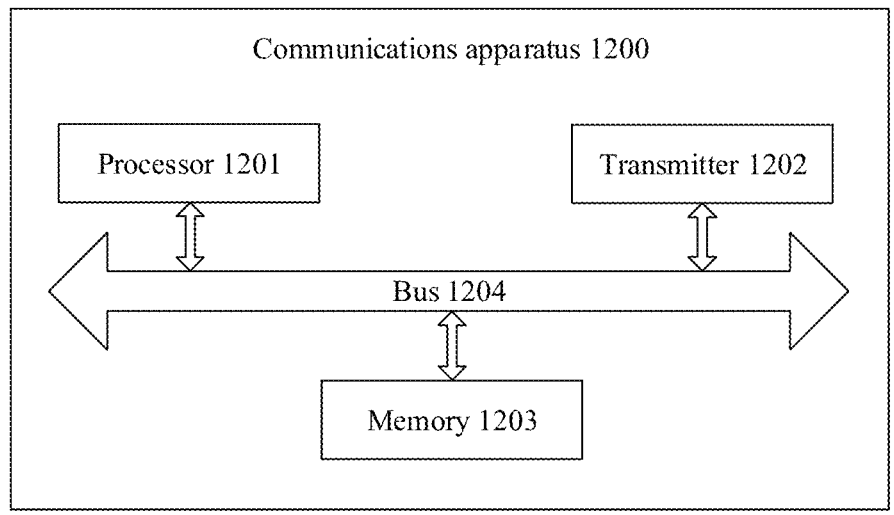
FIG. 12 is a schematic structural diagram of a communications apparatus according to an embodiment of this application.

Correspondingly, this application provides a communications apparatus. Referring to FIG. 12, the communications apparatus 1200 includes:

a processor 1201, configured to obtain a delay quantization parameter corresponding to a common RTD, where the delay quantization parameter includes a first quantization parameter, and the first quantization parameter is used to indicate a height-related delay; and a transmitter 1202, configured to send the delay quantization parameter.

In an optional implementation, the transmitter 1202 is configured to send a broadcast signal, where the broadcast signal carries the delay quantization parameter.

In an optional implementation, the transmitter 1202 is configured to send the broadcast signal through a broadcast channel or a data channel.

In an optional implementation, the transmitter 1202 is configured to transmit a SIB through a DL-SCH, where the SIB carries the delay quantization parameter of the common RTD.

In a possible implementation, the transmitter 1202 is configured to send a control signal, where the control signal carries the delay quantization parameter.

In an optional implementation, the processor 1201 is further configured to update the second quantization parameter based on an angle or a time period.

The transmitter 1202 is further configured to send the second quantization parameter updated based on the angle or the time period.

In an optional implementation, the transmitter 1202 is configured to send an updated broadcast signal, where the updated broadcast signal carries the second quantization parameter updated based on the angle or the time period.

In an optional implementation, the transmitter 1202 is configured to send an updated control signal, where the updated control signal carries the second quantization parameter updated based on the angle or the time period.

In an optional implementation, the transmitter 1202 may be a wireless or wired transmitter, for example, a radio frequency module or an antenna module. The transmitter 1202 may include one or more antennas, and may be an array antenna or the like.

In an optional implementation, the communications apparatus 1200 further includes a memory 1203. The processor 1201, the transmitter 1202, and the memory 1203 communicate with each other through a bus 1204, or may communicate in another manner such as wireless transmission. The processor 1201 is configured to control the transmitter 1202 to perform a sending operation.

Figure 13:
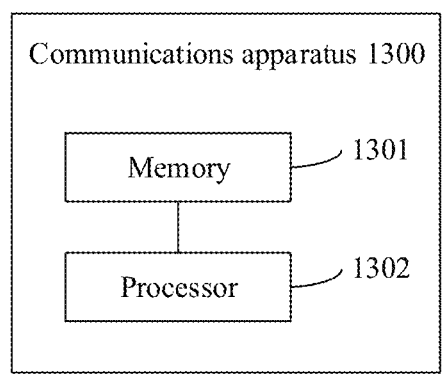
FIG. 13 is a schematic structural diagram of a communications apparatus according to an embodiment of this application.

This application provides a communications apparatus. Referring to FIG. 13, the communications apparatus 1300 includes a memory 1301 and a processor 1302, and the memory 1301 is coupled to the processor 1302. The processor 1302 is configured to: control a receiver to receive a delay quantization parameter of a common RTD, where the delay quantization parameter includes a first quantization parameter, and the first quantization parameter is used to indicate a height-related delay, and obtain the common RTD based on the delay quantization parameter. The processor 1302 is further configured to: control the receiver to receive a second quantization parameter updated based on an angle or a time period, and update the angle-related delay based on the updated second quantization parameter.

Figure 14:
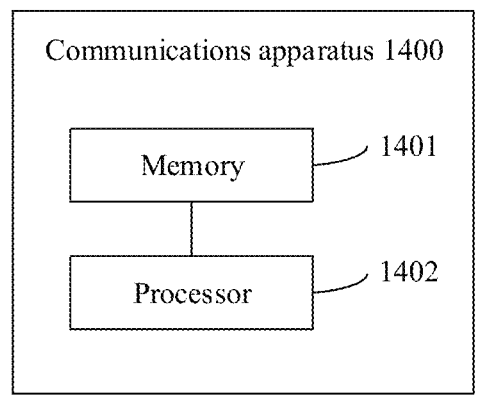
FIG. 14 is a schematic structural diagram of a communications apparatus according to an embodiment of this application.

Correspondingly, this application provides a communications apparatus. Referring to FIG. 14, the communications apparatus 1400 includes a memory 1401 and a processor 1402, and the memory 1401 is coupled to the processor 1402. The processor 1402 is configured to: obtain a delay quantization parameter corresponding to a common RTD, where the delay quantization parameter includes a first quantization parameter, and the first quantization parameter is used to indicate a height-related delay, and send the delay quantization parameter by using a transmitter. The processor 1402 is further configured to update the second quantization parameter based on an angle or a time period, and control the transmitter to send a second quantization parameter updated based on an angle or a time period.

An embodiment of this application provides a communications system. The system includes the apparatus in any possible implementation shown in FIG. 9 and the apparatus in any possible implementation shown in FIG. 10. Alternatively, the system includes the apparatus in any possible implementation shown in FIG. 11 and the apparatus in any possible implementation shown in FIG. 12. Alternatively, the system includes the apparatus in any possible implementation shown in FIG. 13 and the apparatus in any possible implementation shown in FIG. 14.

This application provides a processor, and the processor includes:

at least one circuit, configured to receive a delay quantization parameter of a common RTD by using the receiver, where the delay quantization parameter includes a first quantization parameter, and the first quantization parameter is used to indicate a height-related delay; and at least one circuit, configured to obtain the common RTD based on the delay quantization parameter.

Correspondingly, this application provides a processor, and the processor includes:

at least one circuit, configured to obtain a delay quantization parameter corresponding to a common RTD, where the delay quantization parameter includes a first quantization parameter, and the first quantization parameter is used to indicate a height-related delay; and at least one circuit, configured to send the delay quantization parameter by using a transmitter.

An embodiment of this application provides a chip, including a processor, configured to invoke, from a memory, and run instructions stored in the memory, so that a communications device in which the chip is installed performs the foregoing method for processing a round trip delay.

An embodiment of this application further provides another chip, including an input interface, an output interface, a processor, and a memory. The input interface, the output interface, the processor, and the memory are connected through an internal connection path. The processor is configured to execute code in the memory. When the code is executed, the processor is configured to perform the method for processing a round trip delay.

It should be understood that the processor may be a central processing unit (CPU); or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computing machine (advanced RISC machines, ARM) architecture.

This application provides a readable storage medium. The computer-readable storage medium stores a computer program. The computer program includes at least one segment of code, and the at least one segment of code may be executed by a computer, to control the computer to perform corresponding steps and/or procedures in the foregoing method embodiments.

This application provides a computer program. When the computer program is executed by a computer, the processor or the computer may perform corresponding steps and/or procedures in the foregoing method embodiments.

Further, in an optional embodiment, the foregoing memory may include a read-only memory and a random access memory, and provide instructions and data to the processor. The memory may further include a non-volatile random access memory. For example, the memory may further store information about a device type.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. For example but not limitation, many forms of RAMs are available. For example, a static random access memory (static RAM, SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

What is claimed is:

1. A method for processing a round trip delay, wherein the method is applied to a second communications apparatus, and comprises:
   receiving a delay quantization parameter of a common round trip delay (RTD) rather than the RTD itself, from a first communication apparatus, wherein the delay quantization parameter comprises a first quantization parameter, and the first quantization parameter is a delay index, and the delay index indicates a height-related delay at a height of the first communication apparatus corresponding to the delay index; and
   obtaining the common RTD based on a correspondence between the delay index and a height related delay stored in the second communication apparatus.

2. The method according to claim 1, wherein the receiving the delay quantization parameter of the common RTD comprises:
   receiving a broadcast signal, wherein the broadcast signal carries the delay quantization parameter of the common RTD.

3. The method according to claim 1, wherein the delay quantization parameter further comprises a second quantization parameter, and the second quantization parameter indicates an angle-related delay.

4. The method according to claim 3, wherein the first quantization parameter and the second quantization parameter use different time quantization units.

5. The method according to claim 3, further comprising:
   receiving a second quantization parameter updated based on an angle or a time period; and
   updating the angle-related delay based on the updated second quantization parameter.

6. The method according to claim 1, wherein
   the first quantization parameter is a delay parameter, different heights correspond to different delay parameters, and the different delay parameters correspond to a same time quantization unit; and the delay parameter is used to determine, based on the time quantization unit, a height-related delay at a height corresponding to the delay parameter.

7. The method according to claim 1, wherein the first quantization parameter comprises a level-1 parameter and a level-2 parameter, the level-1 parameter indicates a communications device type, the level-2 parameter indicates a height, and a combination of the level-1 parameter and the level-2 parameter indicates the height-related delay.

8. A method for processing a round trip delay, wherein the method is applied to a first communications apparatus, and comprises:
   obtaining a delay quantization parameter of a common round trip delay (RTD), wherein the delay quantization parameter comprises a first quantization parameter, and the first quantization parameter is a delay index, and the delay index indicates a height-related delay at a height of the first communication apparatus corresponding to the delay index; and
   sending the delay quantization parameter rather than the RTD itself, to a second communication apparatus which obtains the RTD based on a correspondence between the delay index and a height-related delay stored in the second communication apparatus.

9. The method according to claim 8, wherein the sending the delay quantization parameter comprises:
   transmitting a broadcast signal, wherein the broadcast signal carries the delay quantization parameter of the common RTD.

10. The method according to claim 8, wherein the delay quantization parameter further comprises a second quantization parameter, and the second quantization parameter indicates an angle-related delay quantized value.

11. The method according to claim 10, wherein the first quantization parameter and the second quantization parameter use different time quantization units.

12. The method according to claim 10, further comprising:
   updating the second quantization parameter based on an angle or a time period; and
   sending the second quantization parameter updated based on the angle or the time period.

13. The method according to claim 8, wherein
   the first quantization parameter is a delay parameter, different heights correspond to different delay parameters, the different delay parameters correspond to a same time quantization unit, and the delay parameter is obtained based on the height-related delay and the time quantization unit.

14. The method according to claim 13, wherein the first quantization parameter comprises a level-1 parameter and a level-2 parameter, the level-1 parameter indicates a communications device type, the level-2 parameter indicates a height, and a combination of the level-1 parameter and the level-2 parameter indicates the height-related delay.

15. A second communications apparatus, comprising a processor and a memory which is coupled to the processor;
wherein the memory is configured to store a computer program; and
the processor is configured to execute the computer program stored in the memory, the computer program when executed by the processor, cause the apparatus to:
receive a delay quantization parameter of a common round trip delay (RTD) rather than the RTD itself, from a first communication apparatus, wherein the delay quantization parameter comprises a first quantization parameter, and the first quantization parameter is a delay index, and the delay index indicates a height-related delay at a height of the first communication apparatus corresponding to the delay index; and
obtain the common RTD based on a correspondence between the delay index and a height-related delay stored in the second communication apparatus.

16. The apparatus according to claim 15, wherein the receiving the delay quantization parameter of the common RTD comprises:
receiving a broadcast signal, wherein the broadcast signal carries the delay quantization parameter of the common RTD.

17. The apparatus according to claim 15, wherein the delay quantization parameter further comprises a second quantization parameter, and the second quantization parameter indicates an angle-related delay.

18. The apparatus according to claim 17, wherein when the computer program is executed by the processor, the apparatus is further caused to:
receive a second quantization parameter updated based on an angle or a time period; and
update the angle-related delay based on the updated second quantization parameter.

19. The apparatus according to claim 15, wherein the first quantization parameter and a second quantization parameter use different time quantization units.

20. The apparatus according to claim 15, wherein
the first quantization parameter is a delay parameter, different heights correspond to different delay parameters, and the different delay parameters correspond to a same time quantization unit; and the delay parameter is used to determine, based on the time quantization unit, a height-related delay at a height corresponding to the delay parameter;
the first quantization parameter comprises a level-1 parameter and a level-2 parameter, the level-1 parameter indicates a communications device type, the level-2 parameter indicates a height, and a combination of the level-1 parameter and the level-2 parameter indicates the height-related delay.

* * * * *